United States Patent
Tseng et al.

(10) Patent No.: US 10,530,953 B2
(45) Date of Patent: Jan. 7, 2020

(54) COPY METHOD OF GENERATING AND COMPARING GENERATION-COUNT INFORMATION (71) Applicant: AVISION INC., Hsinchu (TW)

(72) Inventors: Cheng Chen Tseng, Hsinchu County (TW); Chen-Chang Li, Miaoli County (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 15/630,354

(22) Filed: Jun. 22, 2017

(65) Prior Publication Data

US 2018/0013908 A1    Jan. 11, 2018

(30) Foreign Application Priority Data

Jul. 6, 2016  (TW) .............................. 105121312 A (51) Int. Cl.
  *H04N 1/00*    (2006.01)
  *H04N 1/32*    (2006.01)
  *G06K 15/02*   (2006.01)
  *G06F 3/12*    (2006.01)

(52) U.S. Cl.
  CPC ..... *H04N 1/00875* (2013.01); *H04N 1/00846* (2013.01); *H04N 1/00851* (2013.01); *H04N 1/32133* (2013.01); *H04N 2201/0094* (2013.01); *H04N 2201/3269* (2013.01)

(58) Field of Classification Search
  None
  See application file for complete search history.

(56) References Cited

U.S. PATENT DOCUMENTS

| 5,444,779 A * | 8/1995 | Daniele ................. G03G 21/02 358/462 |
| 5,845,008 A * | 12/1998 | Katoh ...................... G07D 7/12 382/217 |
| 9,998,470 B1 * | 6/2018 | Hockings ................ H04L 63/10 |
| 2003/0169456 A1 * | 9/2003 | Suzaki ................... G06T 1/0028 358/3.28 |
| 2006/0033942 A1 * | 2/2006 | Yamazaki ............ G03G 21/046 358/1.12 |
| 2006/0126095 A1 | 6/2006 | Tamura et al. |

(Continued)

FOREIGN PATENT DOCUMENTS

| CN | 1787590 A | 6/2006 |
| CN | 101315534 A | 12/2008 |

(Continued)

*Primary Examiner* — Beniyam Menberu
(74) *Attorney, Agent, or Firm* — Muncy, Geissler, Olds & Lowe, P.C.

(57) ABSTRACT

A copy method used in a copy system or a copy apparatus connected to a cloud server includes steps of: scanning a document to obtain old image data containing an old information block; generating new image data containing a new information block according to the old image data; printing the new image data on a medium; and comparing different generations of original image data, one of which is contained in the old image data, in the cloud server to judge whether improper modifications are present on the original image data or not, and notifying an information office to perform an inspection when the improper modifications are present.

10 Claims, 7 Drawing Sheets

(56) References Cited

U.S. PATENT DOCUMENTS

| | | | |
|---|---|---|---|
| 2006/0242418 A1* | 10/2006 | Willamowski | G06T 1/0071 713/176 |
| 2006/0279785 A1* | 12/2006 | Onishi | H04N 1/00846 358/1.18 |
| 2007/0188775 A1* | 8/2007 | Minamino | H04N 1/00846 358/1.6 |
| 2007/0246542 A1* | 10/2007 | Manheim | G06K 5/00 235/487 |
| 2008/0018942 A1* | 1/2008 | Komiya | G03G 21/046 358/3.28 |
| 2008/0028221 A1* | 1/2008 | Endo | G06F 21/10 713/176 |
| 2008/0297825 A1 | 12/2008 | Hikichi | |
| 2009/0037974 A1 | 2/2009 | Hwang | |
| 2009/0116074 A1* | 5/2009 | Wilsher | H04N 1/32133 358/3.28 |
| 2009/0190183 A1* | 7/2009 | Hosoda | G06T 1/0071 358/3.28 |
| 2009/0213437 A1* | 8/2009 | Takeuchi | H04N 1/00127 358/471 |
| 2009/0304228 A1 | 12/2009 | Ishikawa et al. | |
| 2011/0063343 A1* | 3/2011 | Ito | G06K 7/14 347/5 |
| 2011/0080618 A1* | 4/2011 | Viswanathan | G06F 21/64 358/3.28 |
| 2011/0102853 A1* | 5/2011 | Makishima | H04N 1/00864 358/3.28 |
| 2012/0188581 A1* | 7/2012 | Kakutani | H04N 1/00846 358/1.14 |
| 2012/0229823 A1* | 9/2012 | Sato | H04N 1/00244 358/1.6 |
| 2012/0229867 A1* | 9/2012 | Takagi | G06K 15/02 358/3.28 |
| 2012/0314242 A1* | 12/2012 | Kakutani | G03G 21/046 358/1.14 |
| 2015/0120935 A1* | 4/2015 | Fukasawa | H04L 47/74 709/226 |

FOREIGN PATENT DOCUMENTS

| | | |
|---|---|---|
| CN | 101359214 A | 2/2009 |
| CN | 101600040 A | 12/2009 |

\* cited by examiner

COPY METHOD OF GENERATING AND COMPARING GENERATION-COUNT INFORMATION

This application claims priority of No. 105121312 filed in Taiwan R.O.C. on Jul. 6, 2016 under 35 USC 119, the entire content of which is hereby incorporated by reference.

BACKGROUND OF THE INVENTION

Field of the Invention

This disclosure relates to an image processing device, a copy apparatus and a copy method, and more particularly to an image processing device, a copy apparatus and a copy method of generating generation-count information.

Description of the Related Art

A conventional copier reproduces the full image content of an original but cannot effectively control the reproduction of the confidential document. A conventional copy protection function may be achieved using hidden texts, such as "copy" and "private", printed on all pages. When the page with the copy protection function is being copied, hidden security watermarks present repeatedly on the whole page represent that the copy is not authorized. The watermark for preventing copying is the text pattern, which functions as the background of the document and is pre-stored in the driver or edited by the user when the document is being copied. However, the conventional analog copier does not possess the digital information processing ability, and cannot embed the watermark into the reproduced document. The ordinary way is to print the lighter watermark pattern on the sheet, and the sheet with the printed image serves as the background sheet for copying. For the enterprises or government offices with the requirement of the higher confidential level, if the watermark needs to be embedded into each document, the glass panel for supporting the original may be formed with the specific pattern.

However, such the copy process cannot control the generation count of the original document being copied. For example, a superior unit reproduces and transfers a first generation of copied document to an intermediate unit, the intermediate unit reproduces and transfers a second generation of copied document to a subordinate unit according to the first generation of copied document, and the subordinate unit further reproduces and transfers a third generation of copied document to persons according to the second generation of copied document. However, one of the persons may get the second generation of copied document, and have the second generation of copied document reproduced. Consequently, the person cannot know where does the finally reproduced document come.

SUMMARY OF THE INVENTION

It is therefore an object of this disclosure to provide an image processing device, a copy apparatus and a copy method of generating generation-count information, so that an inspection unit can get more information in inspecting the flow of the confidential document.

To achieve the above-identified object, this disclosure provides an image processing device including a receiving port, a processor, a storage and an output port. The receiving port receives old image data containing an old information block from a peripheral device. The processor electrically connected to the receiving port generates new image data containing a new information block according to the old image data. A first reference point of the old information block is offset from a second reference point of the new information block by a displacement so that copy generation-count information of the new image data is judged according to a position of the second reference point. The output port, electrically connected to the processor outputs the new image data. Copy apparatus and method using the image processing device are also provided.

This disclosure further provides a copy apparatus including a peripheral device and an image processing device. The peripheral device scans a document to obtain old image data containing an old information block. The image processing device is connected to the peripheral device, receives the old image data and generates new image data containing a new information block according to the old image data, wherein the peripheral device further receives the new image data and prints the new image data on a medium, wherein a first reference point of the old information block is offset from a second reference point of the new information block by a displacement so that copy generation-count information of the new image data is judged according to a position of the second reference point.

This disclosure also provides a copy method used in a copy system or a copy apparatus. The copy method includes steps of scanning a document to obtain old image data containing an old information block; generating new image data containing a new information block according to the old image data, wherein a first reference point of the old information block is offset from a second reference point of the new information block by a displacement so that copy generation-count information of the new image data is judged according to a position of the second reference point; printing the new image data on a medium; and comparing different generations of original image data, one of which is contained in the old image data, in the cloud server to judge whether improper modifications are present on the original image data or not, and notifying an information office to perform an inspection when the improper modifications are present.

With the above-mentioned aspects, the new copy generation-count information can be generated according to the old copy generation-count information when the original is copied, so that each generation of copied record of the original can be collected in the copied generation-count information to facilitate the subsequent inspection work. In addition, the restriction of the copy generation-count may also effectively control and prevent the poor effect of security or quality caused after the original is copied through too many generations.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
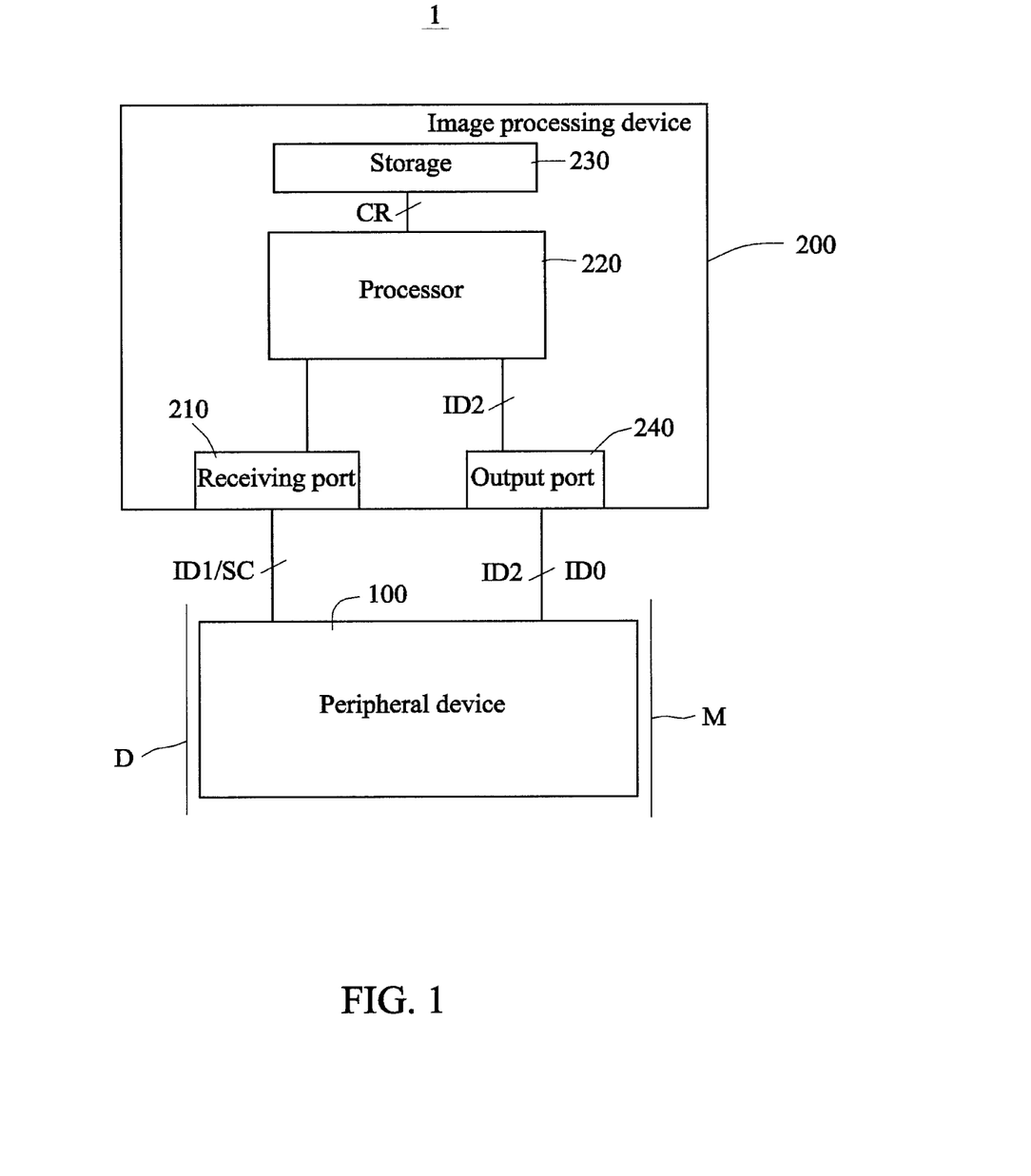
FIG. 1 is a schematic view showing a copy apparatus according to a first embodiment of this disclosure.
Figure 2:
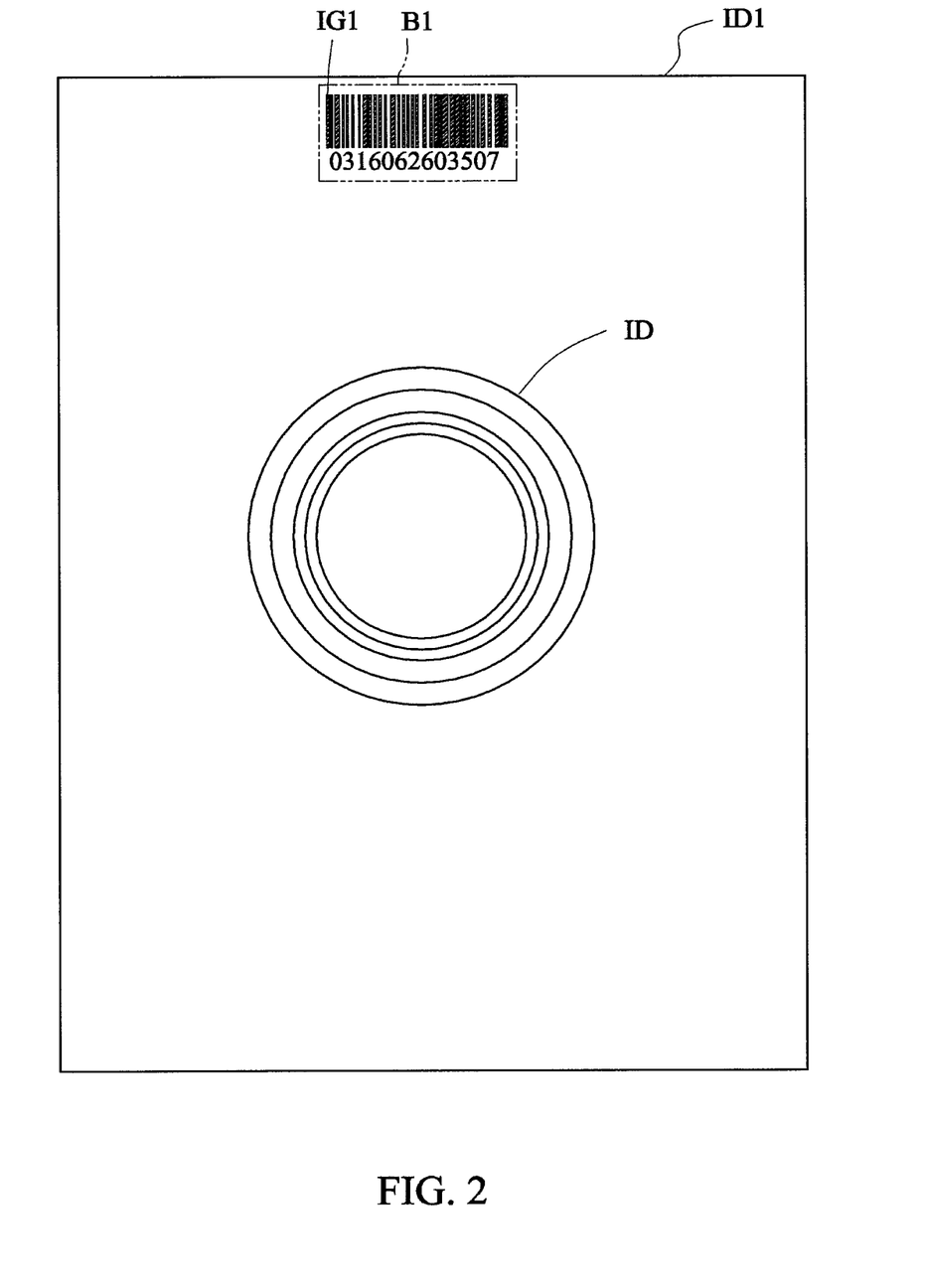
FIG. 2 is a schematic view showing old image data.
Figure 3:
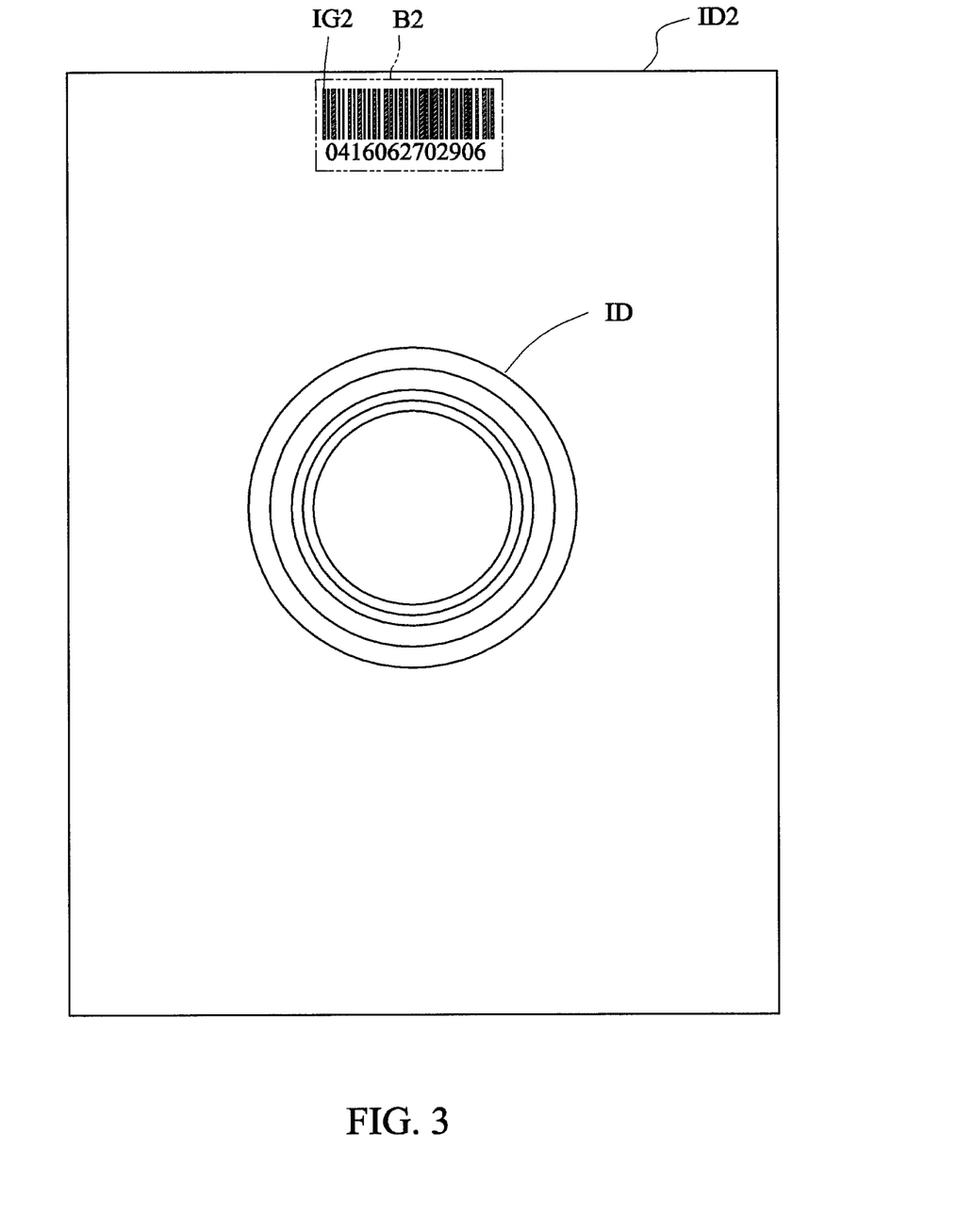
FIG. 3 is a schematic view showing new image data.

Referring to FIGS. 1 to 3, a copy apparatus 1 of a first embodiment comprises an image processing device 200 and a peripheral device 100. The image processing device 200 comprises a receiving port 210, a processor 220, a storage 230 and an output port 240. The image processing device 200 comprises, for example but without limitation to, a computer, a server or a multi-function peripheral.

The receiving port 210 receives old image data ID1 and an encoding requirement signal SC from the peripheral device 100. Each of the receiving port 210 and the output port 240 may have the interface, such as the USB interface, the wired or wireless network interface, which can achieve the communication or electrical connection; or an ordinary direct electrical connection interface (direct bonded together or electrically connected together through electrical connectors). The encoding requirement signal SC may comprise executor's identification data, time, copy count and/or information of the peripheral device. The executor's identification data may be obtained through a biometrics sensor or electronic inductor on the peripheral device. The peripheral device 100 comprises, for example but without limitation to, a scanner, a copier or the like.

The processor 220 electrically connected to the receiving port 210 performs a judging process on the old image data ID1 according to the encoding requirement signal SC. When the processor 220 judges an old information block B1 of the old image data ID1 as containing old copy generation-count information IG1, the processor 220 generates a new information block B2 containing new copy generation-count information IG2 according to the old copy generation-count information IG1. Then, processor 220 subtracts the old information block B1 from the old image data ID1 to obtain a subtracted result and adds the new information block B2 to the subtracted result to generate new image data ID2 and an encoding record CR. The encoding record CR may comprise, for example but without limitation to, the encoding time, the encoding method, the information before encoding, the information after encoding, the information of the encoding requirement signal and the like. The new information block B2 may further comprise the information selected from the group consisting of the user information, the date information and the information of the peripheral device 100.

The storage 230 electrically connected to the processor 220 stores the encoding record CR. The storage 230 may be implemented by a hard disk drive, an optical disk drive, a magnetic tape drive or the like. In one embodiment, the storage 230 may further store the information selected from the group consisting of the old image data ID1, the encoding requirement signal SC and the new copy generation-count information IG2.

The output port 240 electrically connected to the processor 220 outputs the new image data ID2. The output port 240 may have the interface, such as the USB interface or the network interface, capable of achieving the electrical connection.

In one embodiment, the receiving port 210 and the output port 240 may be combined together. In another embodiment, the encoding requirement signal SC may be omitted. That is, the image processing device 200 performs the judging and processing processes upon the receipt of the old image data ID1.

In this embodiment, the processor 220 further outputs the new image data ID2 through the output port 240 to the peripheral device 100 according to the encoding requirement signal SC. The peripheral device 100 may store or transmit the new image data ID2, or print the new image data ID2 on a medium M.

The copy generation-count information represents the information that the original has been copied for how many generations. For example, after the original is copied at the first time, a first generation of reproduced document, on which the generation-count information of 1 is recorded, is obtained. A second generation of reproduced document, on which the generation-count information of 2 is recorded, is obtained by copying the first generation of reproduced document, and so on. Thus, the new copy generation-count information IG2 is equal to the old copy generation-count information IG1 plus one predetermined value, which is 1 in this embodiment. In other embodiments, the predetermined value may be any value, such as 2, 3, 4 or the like.

For example, the old image data ID1 in FIG. 2 contains original image data ID and the old information block B1. The old information block B1 contains the information, such as bar codes corresponding to the human-readable code of 0316062603507, which represents that the copy generation-count is three (03), the copy time falls on Jun. 26, 2016 (160626), the code of the copy requester is (035), and the copy count is seven (07) in order. The new image data ID2 processed by the image processing device 200 of this embodiment contains the original image data ID and the new information block B2. The new information block B2 contains the information of the bar codes corresponding to the human-readable code of 0416062702906, which represents that the copy generation-count is four (04) (representing the reproduced document is copied from the third generation of reproduced document), the copy time falls on Jun. 27, 2016 (160627), the code of the copy requester is (029), and the copy count is six (06) in order.

It is worth noting that the image processing device 200 and the peripheral device 100 may be implemented separately, and may also be combined into an integrated copy apparatus 1. That is, the image processing device 200 and the peripheral device 100 are mounted in a casing of the copy apparatus 1, wherein the associated data or records may be selected and only stored in the copy apparatus 1, or transmitted to a cloud apparatus through the network. In this case, the copy apparatus 1 comprises the peripheral device 100 and the image processing device 200. The peripheral device 100 scans a document D to obtain the old image data ID1. The image processing device 200 connected to the peripheral device 100 receives the old image data ID1 and the encoding requirement signal SC, and performs the judging process on (or according to) the old image data ID1 according to the encoding requirement signal SC. When the old information block B1 is judged as containing the old copy generation-count information IG1, the new information block B2 containing the new copy generation-count information IG2 is generated according to the old copy generation-count information IG1, and the old information block B1 is subtracted from the old image data ID1 to obtain a subtracted result and the new information block B2 is added to the subtracted result to generate the new image data ID2 and the encoding record CR. Next, the peripheral device 100 further receives the new image data ID2, and prints the new image data ID2 on the medium M to complete the copy process.

Figure 4:
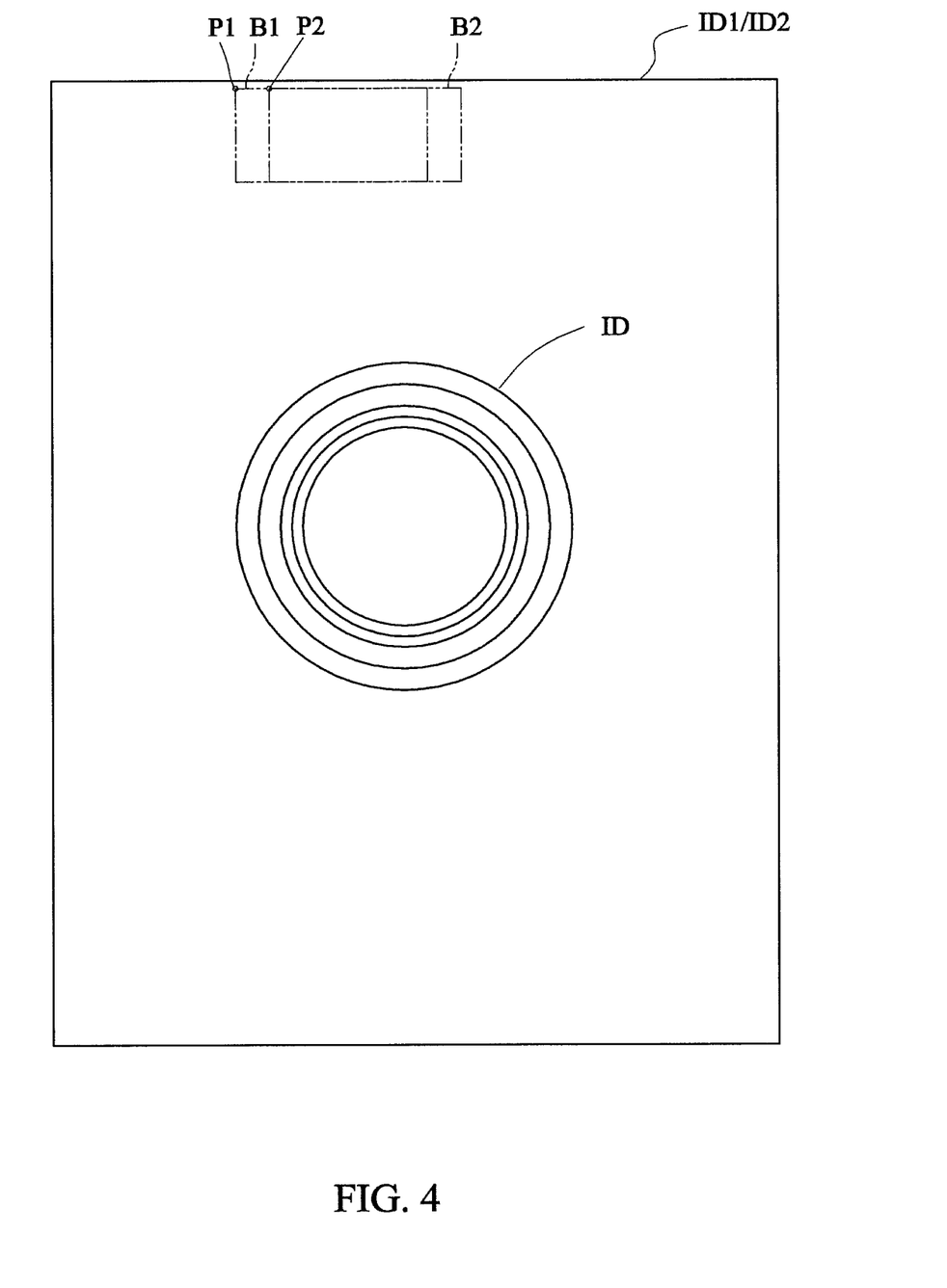
FIG. 4 is a schematic view showing the old and new image data.

In FIGS. 2 and 3, the old information block B1 is replaced with the new information block B2, and the blocks B1 and B2 are located at the same position. This is beneficial to the judging accuracy of the image processing device 200. In FIG. 4, the old information block B1 is replaced with the new information block B2, but the two blocks B1 and B2 are located at different positions. A reference point P1 of the old information block B1 is offset from a reference point P2 of the new information block B2 by a displacement. The image processing device 200 may also judge the generation count (new copy generation-count information) according to the position of the reference point P2. That is, the bar codes may not contain the generation-count information, or the generation-count information is directly replaced with the position of the reference point.

Figure 5:
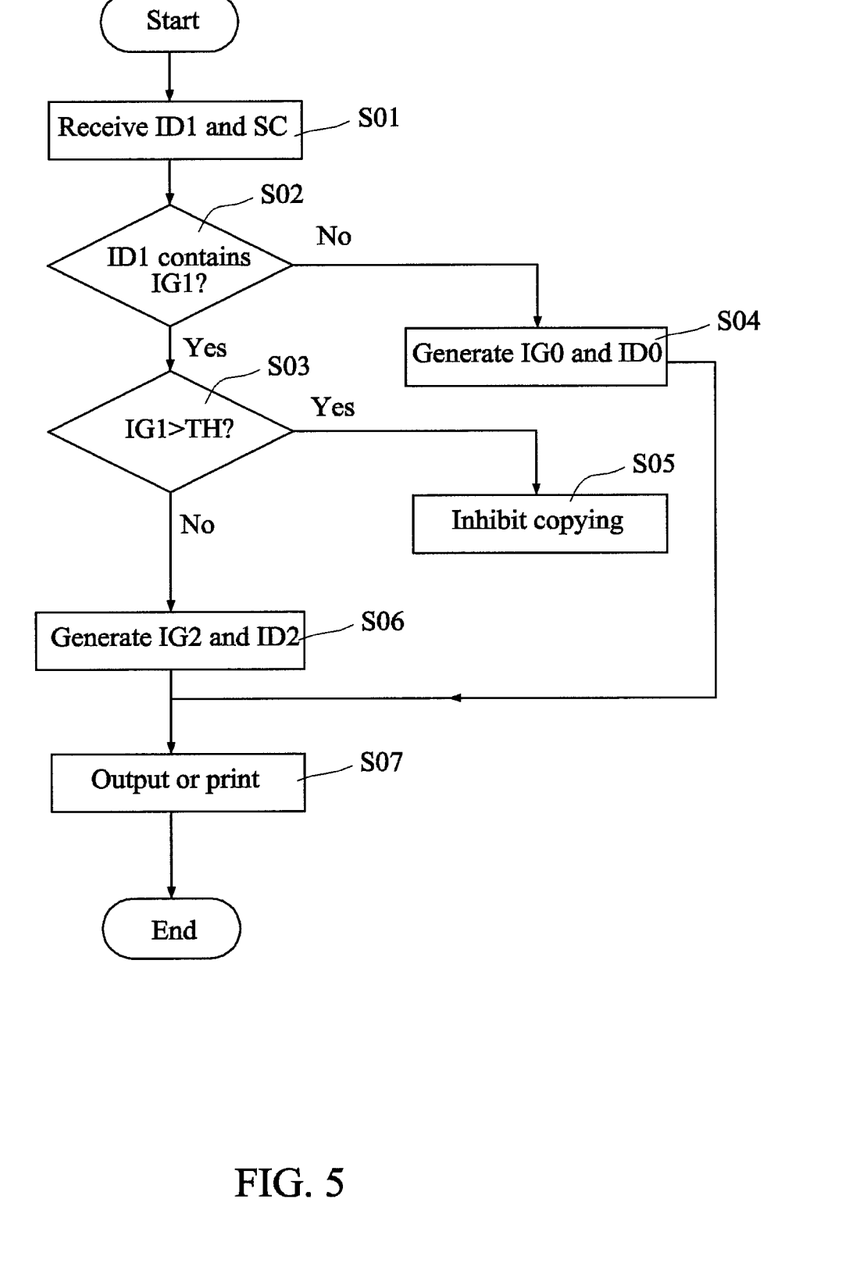
FIG. 5 is a flow chart showing an image processing method of the copy apparatus according to the first embodiment of this disclosure.

FIG. 5 is a flow chart showing an image processing method of the copy apparatus according to the first embodiment of this disclosure. First, in step S01, the peripheral device 100 scans the document D to obtain the old image data ID1, and the image processing device 200 receives the old image data ID1 and the encoding requirement signal SC. Next, in step S02, the image processing device 200 performs a judging process on the old image data ID1 according to the encoding requirement signal SC to judge whether the old information block B1 of the old image data ID1 contains the old copy generation-count information IG1 or not. If the judged result of the step S02 is affirmative, then step S03 is performed and the image processing device 200 judges whether the old copy generation-count information IG1 is greater than a threshold value TH. If the judged result of the step S03 is affirmative, then step S05 is executed and the image processing device 200 generates a copy inhibiting signal, to inhibit the new image data ID2 from being generated, and informs the peripheral device of the associated message. If the judged result of the step S03 is negative, then step S06 is executed and the image processing device 200 generates the new information block B2 containing the new copy generation-count information IG2 according to the old copy generation-count information IG1, subtracts the old information block B1 from the old image data ID1 to obtain a subtracted result and adds the new information block B2 to the subtracted result to generate the new image data ID2 and the encoding record CR. Next, step S07 is executed to perform outputting or printing to output the new image data ID2 or print the new image data ID2 on the medium M. If the judged result of the step S02 is negative, then step S04 is performed to generate first generation copy information IG0 and first generation image data ID0 according to the old image data ID1, and the step S07 is continued. That is, when the old copy generation-count information IG1 is absent, the image processing device 200 regards the document to be copied as an original, and adds the copy generation-count information of the first generation to the reproduced document, and generates the first generation image data.

Figure 6:
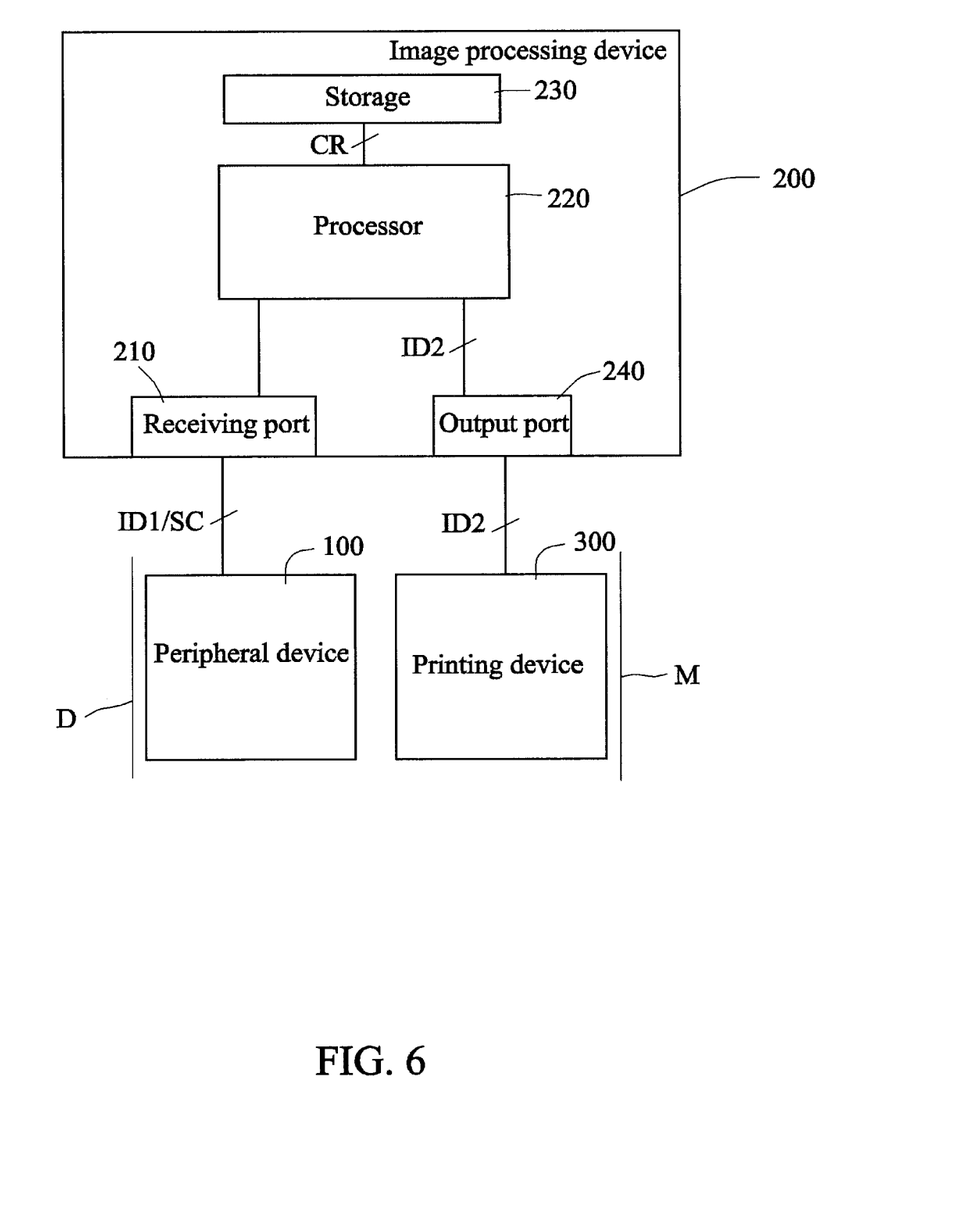
FIG. 6 is a schematic view showing the copy apparatus according to a second embodiment of this disclosure.

FIG. 6 is a schematic view showing the copy apparatus according to the second embodiment of this disclosure. As shown in FIG. 6, this embodiment is similar to the first embodiment except for the difference that the new image data ID2 is outputted to a printing device 300 different from the peripheral device 100, and the printing device 300 prints the new image data ID2 on the medium M. In this case, the encoding requirement signal SC may contain the information of specifying the printing device 300.

Figure 7:
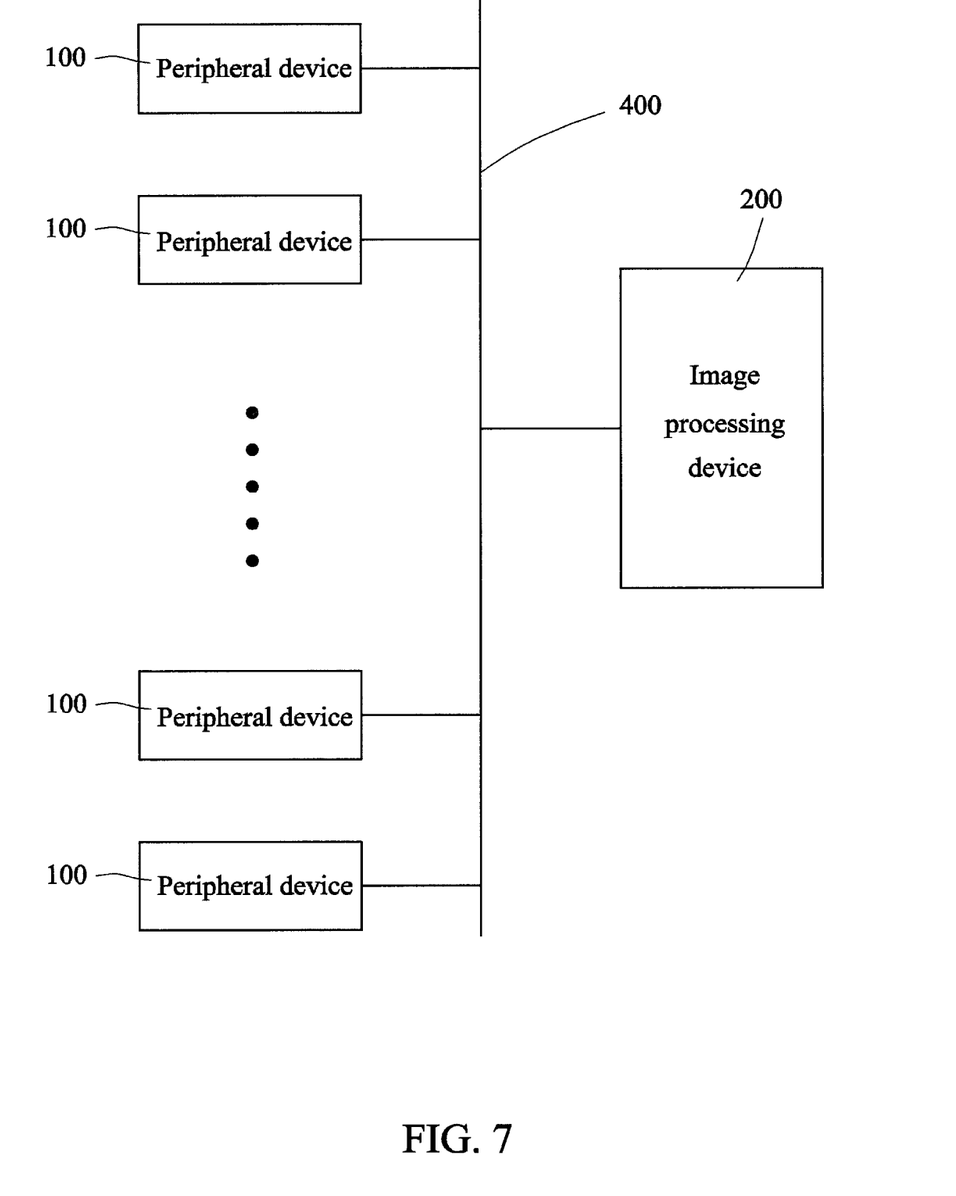
FIG. 7 is a schematic view showing a copy system according to the preferred embodiment of this disclosure.

FIG. 7 is a schematic view showing a copy system according to the preferred embodiment of this disclosure. The copy method of FIG. 5 may also be applied to the copy system. As shown in FIG. 7, multiple peripheral devices 100 are connected to the image processing device 200, which may be regarded as a cloud server, through a network 400. The copy operation of each peripheral device 100 is controlled and recorded by the image processing device 200 to implement the copy processes with the copy history records in the office or unit. Also, different generations of original image data ID may be compared in the cloud server to immediately judge whether the original image data ID is improperly modified or not, and notify the information office or unit to perform the inspection when the original image data ID is improperly modified.

With the above-mentioned embodiment of this disclosure, the new copy generation-count information can be generated according to the old copy generation-count information when the original is copied, so that each generation of copied record of the original can be collected in the copied generation-count information to facilitate the subsequent inspection work. In addition, the restriction of the copy generation-count may also effectively control and prevent the poor effect of security or quality caused after the original is copied through too many generations.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A copy method used in a copy system or a copy apparatus connected to a cloud server, the copy method comprising steps of:
   scanning a document to obtain old image data containing an old information block;
   generating new image data containing a new information block according to the old image data; and
   comparing different generations of original image data, one of which is contained in the old image data, in the cloud server to judge whether modifications are present on the original image data or not, and notifying an information office when the modifications are present, wherein a first reference point of the old information block is offset from a second reference point of the new information block by a displacement so that copy generation-count information of the new image data is judged according to a position of the second reference point.

2. The copy method according to claim 1, wherein the information office is notified to perform an inspection when the modifications are present.

3. The copy method according to claim 1, wherein the different generations of the original image data are compared in the cloud server to judge whether the modifications present on the original image data are improper or not.

4. The copy method according to claim 3, wherein the information office is notified to perform an inspection when the modifications present on the original image data are improper.

5. The copy method according to claim 1, further comprising a step of printing the new image data on a medium.

6. A copy method used in a copy system or a copy apparatus connected to a cloud server, the copy method comprising steps of:

scanning a document to obtain old image data containing an old information block;

generating new image data containing a new information block according to the old image data; and     comparing different generations of original image data, one of which is contained in the old image data, in the cloud server to judge whether modifications are present on the original image data or not, and notifying an information office when the modifications are present % wherein the new information block containing new copy generation-count information is generated according to old copy generation-count information contained in the old information block of the old image data, the old information block is subtracted from the old image data to obtain a subtracted result and the new information block is added to the subtracted result to generate the new image data.

7. The copy method according to claim 6, wherein the information office is notified to perform an inspection when the modifications are present.

8. The copy method according to claim 6, wherein the different generations of the original image data are compared in the cloud server to judge whether the modifications present on the original image data are improper or not.

9. The copy method according to claim 8, wherein the information office is notified to perform an inspection when the modifications present on the original image data are improper.

10. The copy method according to claim 6, further comprising a step of printing the new image data on a medium.

* * * * *